United States Patent
Clugston, Jr.

(10) Patent No.: US 7,235,765 B2
(45) Date of Patent: Jun. 26, 2007

(54) SOLAR SENSOR INCLUDING REFLECTIVE ELEMENT TO TRANSFORM THE ANGULAR RESPONSE

(75) Inventor: P Edward Clugston, Jr., Windham, ME (US)

(73) Assignee: Control Devices, Inc., Standish, ME (US)

( * ) Notice: Subject to any disclaimer, the term of this patent is extended or adjusted under 35 U.S.C. 154(b) by 0 days.

(21) Appl. No.: 11/419,352

(22) Filed: May 19, 2006

(65) Prior Publication Data

US 2006/0208153 A1    Sep. 21, 2006

Related U.S. Application Data

(62) Division of application No. 10/738,726, filed on Dec. 17, 2003.

(60) Provisional application No. 60/466,815, filed on Apr. 30, 2003.

(51) Int. Cl.
*G01C 21/02*    (2006.01)
(52) U.S. Cl. .................... 250/203.4; 250/239; 126/573
(58) Field of Classification Search .. 250/203.1–203.4, 250/208.6, 239, 216; 356/139.01, 139.02; 126/572, 573
See application file for complete search history.

(56) References Cited

U.S. PATENT DOCUMENTS

| | | | |
|---|---|---|---|
| 2,402,662 A | 6/1946 | Ohl | |
| 2,423,278 A | 7/1947 | Willis, Jr. | |
| 2,827,594 A | 3/1958 | Rabinow | |
| 2,944,188 A | 7/1960 | Lohr et al. | |
| 3,018,313 A | 1/1962 | Gattone | |
| 3,064,131 A | 11/1962 | Brown | |
| 3,293,440 A | 12/1966 | Mueller | |
| 3,539,883 A | 11/1970 | Harrison | |
| 3,614,775 A | 10/1971 | Brean | |
| 3,836,773 A | 9/1974 | Burke et al. | |
| 3,843,267 A | 10/1974 | Vital et al. | |
| 3,925,244 A | 12/1975 | Nagasawa et al. | |
| 4,045,769 A | 8/1977 | Faller | |
| 4,131,540 A | 12/1978 | Husome et al. | |
| 4,223,174 A | 9/1980 | Moeller | |
| 4,239,962 A | 12/1980 | Oehler | |
| 4,249,160 A | 2/1981 | Chilvers | |
| 4,320,288 A | 3/1982 | Schlarlack | |
| 4,332,973 A | 6/1982 | Sater | |
| 4,358,186 A | 11/1982 | Johnson et al. | |

(Continued)

FOREIGN PATENT DOCUMENTS

DE    38 21 743    11/1990

(Continued)

*Primary Examiner*—Kevin Pyo
(74) *Attorney, Agent, or Firm*—Woodard, Emhardt, Moriarty, McNett & Henry LLP

(57) ABSTRACT

A solar sensor that utilizes a blocking element and curved reflective element between the sun and a photo-sensitive electronic device to provide high signal levels and the ability to shape the angular response of the overall sensor. A particular angular response can be achieved by combining the attenuating affects of the blocking element with the increased response affects of the curved reflector. These two elements may be combined into one physical structure, or may be separate. Further, the present invention contemplates the use of multiple blocking elements and multiple reflectors.

21 Claims, 4 Drawing Sheets

U.S. PATENT DOCUMENTS

| | | |
|---|---|---|
| 4,370,974 A | 2/1983 | Maxey |
| 4,477,172 A | 10/1984 | Yokota |
| 4,509,502 A | 4/1985 | Youcha |
| 4,568,826 A | 2/1986 | Pitel et al. |
| 4,613,791 A | 9/1986 | Kurihara et al. |
| 4,629,941 A | 12/1986 | Ellis et al. |
| 4,632,542 A | 12/1986 | Whiteside |
| 4,634,223 A | 1/1987 | Ishii |
| 4,645,975 A | 2/1987 | Meitzler et al. |
| 4,665,321 A | 5/1987 | Chang et al. |
| 4,701,611 A | 10/1987 | Kissinger |
| 4,709,145 A | 11/1987 | Spillman, Jr. |
| 4,713,533 A | 12/1987 | Bremer et al. |
| 4,728,861 A | 3/1988 | Kurihara et al. |
| 4,760,772 A | 8/1988 | Horiguchi et al. |
| 4,850,692 A | 7/1989 | Hirao et al. |
| 4,863,224 A | 9/1989 | Afian et al. |
| 4,870,264 A | 9/1989 | Beha |
| 4,874,938 A | 10/1989 | Chuang |
| 4,896,031 A | 1/1990 | Pettersson et al. |
| 4,933,550 A | 6/1990 | Hegyi |
| 4,937,443 A | 6/1990 | Smoot |
| 4,982,081 A | 1/1991 | Schmidt |
| 5,020,424 A | 6/1991 | Iida et al. |
| 5,029,276 A | 7/1991 | Buehler et al. |
| 5,036,437 A | 7/1991 | Macks |
| 5,064,274 A | 11/1991 | Alten |
| 5,065,015 A | 11/1991 | Horiguchi et al. |
| 5,072,106 A | 12/1991 | Osawa |
| 5,117,099 A | 5/1992 | Schmidt |
| 5,117,744 A | 6/1992 | Zimmer et al. |
| 5,162,643 A | 11/1992 | Currie |
| 5,181,654 A | 1/1993 | Yoshimi et al. |
| 5,182,502 A | 1/1993 | Slotkowski et al. |
| 5,186,682 A | 2/1993 | Iida |
| 5,193,894 A | 3/1993 | Lietar et al. |
| 5,216,248 A | 6/1993 | Ikeda et al. |
| 5,228,772 A | 7/1993 | Mitchell et al. |
| 5,234,049 A | 8/1993 | Palazzetti et al. |
| 5,235,178 A | 8/1993 | Hegyi |
| 5,264,691 A | 11/1993 | Hegyi |
| 5,302,815 A | 4/1994 | Eggenschwiler |
| 5,331,251 A | 7/1994 | Marois |
| 5,337,802 A | 8/1994 | Kajino et al. |
| 5,349,267 A | 9/1994 | Brassier et al. |
| 5,351,151 A | 9/1994 | Levy |
| 5,352,886 A | 10/1994 | Kane |
| 5,416,318 A | 5/1995 | Hegyi |
| 5,426,294 A | 6/1995 | Kobayashi et al. |
| 5,434,407 A | 7/1995 | Bauer et al. |
| 5,444,234 A | 8/1995 | Hennerici et al. |
| 5,451,822 A | 9/1995 | Bechtel et al. |
| 5,453,662 A | 9/1995 | Gottlieb |
| 5,469,340 A | 11/1995 | Heizmann |
| 5,473,515 A | 12/1995 | Liu |
| 5,483,060 A | 1/1996 | Sugiura et al. |
| 5,483,107 A | 1/1996 | Xander |
| 5,499,168 A | 3/1996 | Cochard et al. |
| 5,510,983 A | 4/1996 | Iino |
| 5,517,017 A | 5/1996 | Yamada et al. |
| 5,517,020 A | 5/1996 | Lamo |
| 5,518,176 A | 5/1996 | Turner et al. |
| 5,523,557 A | 6/1996 | Bruno |
| 5,530,240 A | 6/1996 | Larson et al. |
| 5,537,003 A | 7/1996 | Bechtel et al. |
| 5,550,677 A | 8/1996 | Schofield et al. |
| 5,555,136 A | 9/1996 | Waldmann et al. |
| 5,562,336 A | 10/1996 | Gotou |
| 5,592,146 A | 1/1997 | Kover, Jr. |
| 5,602,384 A | 2/1997 | Nunogaki et al. |
| 5,617,112 A | 4/1997 | Yoshida et al. |
| 5,625,182 A | 4/1997 | Guenter |
| 5,629,941 A | 5/1997 | Kawanishi et al. |
| 5,633,710 A | 5/1997 | Kumra et al. |
| 5,645,338 A | 7/1997 | Kobayashi |
| 5,648,873 A | 7/1997 | Jaster et al. |
| 5,650,608 A | 7/1997 | Redford et al. |
| 5,655,832 A | 8/1997 | Pelka et al. |
| 5,660,454 A | 8/1997 | Mori et al. |
| 5,670,774 A | 9/1997 | Hill |
| 5,676,453 A | 10/1997 | Parkyn, Jr. et al. |
| 5,680,033 A | 10/1997 | Cha |
| 5,705,804 A | 1/1998 | Ramer et al. |
| 5,709,145 A | 1/1998 | Shih |
| 5,715,093 A | 2/1998 | Schierbeek et al. |
| 5,726,441 A | 3/1998 | Samukawa et al. |
| 5,773,819 A | 6/1998 | Ramer et al. |
| 5,783,819 A | 7/1998 | Shimoyama et al. |
| 5,796,094 A | 8/1998 | Schofield et al. |
| 5,802,784 A | 9/1998 | Federmann |
| 5,812,321 A | 9/1998 | Schierbeek et al. |
| 5,834,765 A | 11/1998 | Ashdown |
| 5,835,613 A | 11/1998 | Breed et al. |
| 5,837,994 A | 11/1998 | Stam et al. |
| 5,837,995 A | 11/1998 | Chow et al. |
| 5,845,000 A | 12/1998 | Breed et al. |
| 5,877,490 A | 3/1999 | Ramer et al. |
| 5,877,849 A | 3/1999 | Ramer et al. |
| 5,877,897 A | 3/1999 | Schofield et al. |
| 5,886,351 A | 3/1999 | Ramer et al. |
| 5,957,375 A | 9/1999 | West |
| 5,965,986 A | 10/1999 | Borho et al. |
| 5,998,929 A | 12/1999 | Bechtel et al. |
| 6,034,406 A | 3/2000 | Kobayashi et al. |
| 6,066,850 A | 5/2000 | Hersom et al. |
| 6,084,228 A | 7/2000 | Hill et al. |
| 6,087,650 A | 7/2000 | Dage |
| 6,096,375 A | 8/2000 | Ouderkirk et al. |
| 6,097,023 A | 8/2000 | Schofield et al. |
| 6,102,546 A | 8/2000 | Carter |
| 6,130,421 A | 10/2000 | Bechtel et al. |
| 6,243,002 B1 | 6/2001 | Hill et al. |
| 6,297,740 B1 | 10/2001 | Hill et al. |
| 6,396,040 B1 | 5/2002 | Hill |
| 6,417,500 B1 | 7/2002 | Wood |
| 6,521,882 B1 | 2/2003 | Sumiya et al. |
| 6,888,120 B2 * | 5/2005 | Chiasson et al. ........ 250/203.4 |
| 2004/0188593 A1 | 9/2004 | Mullins et al. |

FOREIGN PATENT DOCUMENTS

| | | |
|---|---|---|
| DE | 40 41 769 | 7/1992 |
| DE | 40 41 770 | 7/1992 |
| DE | 42 06 142 | 2/1993 |
| DE | 39 22 153 | 8/1993 |
| DE | 42 15 940 | 11/1993 |
| DE | 43 02 442 | 4/1994 |
| DE | 43 05 446 | 8/1994 |
| DE | 43 29 983 | 3/1995 |
| DE | 195 23 262 | 1/1997 |
| DE | 100 16 419 | 2/2002 |
| EP | 0 776 777 | 4/1997 |
| FR | 2 736 016 | 6/1996 |
| JP | 3 65422 | 3/1991 |
| JP | 5 193337 | 8/1993 |
| WO | WO 01/40842 | 6/2001 |

\* cited by examiner

SOLAR SENSOR INCLUDING REFLECTIVE ELEMENT TO TRANSFORM THE ANGULAR RESPONSE

The present application is a divisional of application Ser. No. 10/738,726, filed Dec. 17, 2003, which claims the benefit of U.S. Provisional Application No. 60/466,815, filed Apr. 30, 2003, each of which are hereby incorporated by reference their entirety.

FIELD OF THE INVENTION

The present invention relates to solar sensors for that respond to the position of the sun, and in particular solar sensors used for adjustment of climate controls of a vehicle.

BACKGROUND OF THE INVENTION

Generally, photodiodes have a cosine angular response, meaning that the peak response of the photodiode is achieved at a normal angle of incidence where light is impinging perpendicular to the surface. This response gradually decreases according to the cosine function to a zero output at 90°.

This cosine response is a drawback in some types of solar sensors. In some vehicles, a solar sensor is used to measure solar heating by sunlight. The sensor represents a sampling of the heating affect occurring on some object, such as a vehicle. However, the solar heating affect only follows the cosine response for objects that are flat. Thus, the use of photodiodes is sometimes limited to modeling the heating of flat objects.

However, many practical solar sensor applications, including especially those with a passenger compartment of a vehicle, are helped by sensors whose response corresponds to such complex three-dimensional shapes.

One of the design goals of automotive solar sensors is to respond to sunlight in a fashion that is consistent with the heating affects on the passenger compartment. In general terms, the desired overhead response is about 50% of the peak response, due to the shading effects of the roof. The peak response typically occurs at about 50° from overhead. The response at the horizon is generally desired to be about 50 to 70% of the peak response, due to the relatively large area of glass exposed in that angular region.

Some automotive solar sensors use a domed diffuser to provide increased response when the sun is near the horizon. The thicker top section reduces the overhead response inherent in the photodiode's cosine-related angular response. One difficulty with this approach is the significant reduction in overall signal current due to the loss of light through the diffuser material. In some solar sensors, the use of a diffuser provides lower signal output for a given size diode, requires a larger diode to achieve a given signal output level, may require additional signal amplification for proper signal processing, and may be characterized with a decreased signal to noise ratio due to the attenuated signal.

What is needed are apparatus and methods which overcome the problems in other solar sensors. The present invention does this in a novel and unobvious manner.

SUMMARY OF THE INVENTION

One embodiment of the present invention is a unique method to adjust the response characteristics of a solar sensor by combining both solar radiation blocking features and solar radiation reflecting features. Other embodiments include unique apparatus and systems for modifying the response characteristics of a solar sensor.

A further embodiment of the present invention pertains to an apparatus whose output corresponds to the angular position of a source of radiation, such as the sun. For some angular positions of the source, one or more opaque regions or opaque bodies block a portion of the radiation from falling incident upon a photosensitive electronic device. In yet other positions of the radiation source, a portion of the radiation that would otherwise have missed the photosensitive electronic device is instead reflected onto the device.

In yet other embodiments of the present invention, an apparatus for responding to the angular position of a radiation source includes one or more reflective surfaces. Preferably the reflective surfaces are curved. The curved shapes can be spherical, parabolic, and conical. Some embodiments of the present invention do not include blocking elements.

Further objects, embodiments, forms, benefits, aspects, features, and advantages of the present invention can be obtained from the description, drawings, and claims provided herein.

DESCRIPTION OF THE PREFERRED EMBODIMENTS

Figure 1:
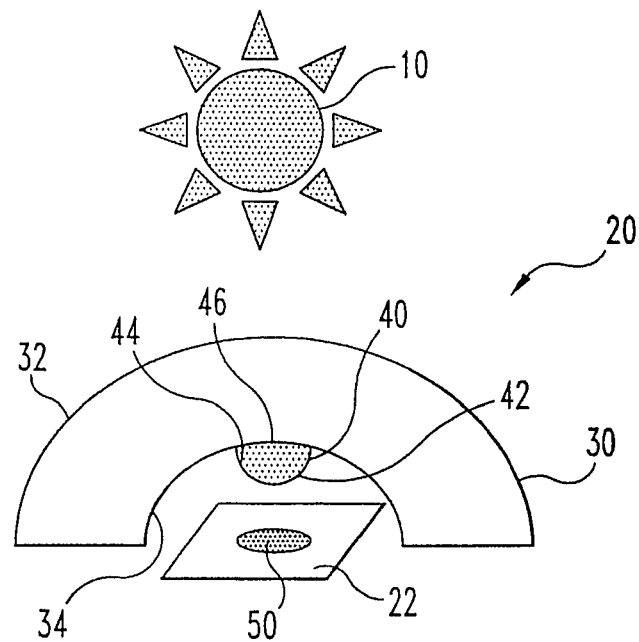
FIG. 1 is a schematic representation according to one embodiment of the present invention.

While the present invention may be embodied in many different forms for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

This application incorporates by reference the following U.S. patent applications: Ser. No. 220,021, filed Jul. 15, 1988, which issued as U.S. Pat. No. 4,933,550; Ser. No. 08/653,818, filed May 28, 1996, which issued as U.S. Pat. No. 5,670,774; Ser. No. 09/188,824, filed Nov. 9, 1998, which issued as U.S. Pat. No. 6,084,228; Ser. No. 09/554,297, filed May 11, 2000, which issued as U.S. Pat. No. 6,297,740; Ser. No. 09/269,701, filed May 31, 1999, which issued as U.S. Pat. No. 6,243,002; and Ser. No. 09/508,789, filed Mar. 16, 2000, which issued as U.S. Pat. No. 6,396,040.

The present invention relates to a solar sensor which provides a signal that corresponds to the angular position and intensity of a source of radiation, such as the sun. In one embodiment, the sensor is part of a system for controlling the climate within a vehicle.

Previous systems for controlling the climate within a vehicle tended to use sensors with limited responses. The sensor would provide a signal output that corresponded to the relative placement between the sensor and the sun, such as along fore and aft, and right and left directions. The output of the sensor would change in a manner corresponding to the radiation from the sun striking a two-dimensional planform.

Other solar sensors lack the methods and structures for modeling the vertical attributes of the passenger compartment of a vehicle. For example, the roof of a vehicle is spaced several feet above the front hood or trunk compartment body sections. Therefore, when the sun is relatively close to the horizon, the front, side, and rear glass of the vehicle compartment allow significant amounts of solar radiation to enter the vehicle compartment. If a solar sensor improperly models the vehicle compartment, this heating affect at low solar angles is not approximated.

In contrast, a solar sensor according to one embodiment of the present invention includes a reflective surface and provides a better approximation of the vehicle compartment. The shape of this reflective surface is adapted and configured such that when the sun is at low angles above the horizon, radiation from the sun which would otherwise not fall incident on the photo-sensitive electronic device is instead reflected off of the reflecting surface and onto the active surface of the photo-sensitive electronic device. In some embodiments, the solar sensor does not include a diffuser. By not including a diffuser, these embodiments provide higher signal levels for a given size photodiode. In other embodiments, a smaller photodiode can be used to achieve a given output signal, thus reducing the sensor cost. Further, subsequent signal amplification can be reduced owing to the increased photocurrent levels. Because the signal levels are higher, the signal to noise ratio is improved.

In one embodiment of the present invention, an approach is developed that uses a shaped blocking element and a curved reflector to transform the inherent cosine angular response of a photodiode into a response more representative of a three-dimensional vehicle compartment. In some embodiments of the present invention, the output response of the photodiode is changed for some angular ranges of the incoming solar radiation relative to the normal cosine response. For other angular ranges of solar radiation the response is decreased relative to the normal cosine response.

In one embodiment of the present invention, the response of the sensor to overhead radiation is attenuated by placing a substantially opaque portion of a body above the photosensitive electronic device. Yet other embodiments of the present invention include a sensor with increased response when the solar radiation approaches the sensor from angles closer to the horizon. In such embodiments, a reflecting element is placed above the photosensitive electronic device such that incoming light is reflected off of the reflecting surface and onto the active, planar surface of the electronic device.

In some embodiments, the reflecting surface is generally above the electronic device. In yet other embodiments, the electronic device is in-between the source of radiation and the reflecting element, such as the case where the reflecting surface is located aft of the electronic device. Solar radiation entering the sensor housing at near horizontal angles passes over the electronic device, strikes the reflecting surface aft of the device, and is reflected forward and downward onto the active surface of the electronic device. In yet other embodiments, the detector is placed over the reflector, with the detector thus functioning as a blocking element. In yet other embodiments, the detector is placed to the side of the reflector or off to the side, at a downward-facing angle.

FIG. 1 is a schematic representation of an apparatus 20 according to one embodiment of the present invention. Apparatus 20 includes a housing 30 having a photosensitive electronic device 22 located therein. Electronic device 22 can be of any type which modifies and/or produces an electrical signal in response to the incidence of solar radiation on an active element. As one example, device 22 can be a single photodiode or an array of photodiodes. In some embodiments using multiple photodiodes, there is also an opaque divider which minimizes the "cross-over" effects as the angle of the sun changes. The figures of this application are not drawn to scale. As one example, the thickness of housing 30 is not representative.

As another example, electronic device 22 can be a single photocell or an array of photocells. In some embodiments of the present invention, the electronic device 22 includes one or more active elements arranged on a generally flat, planar surface. However, the invention is not so limited, and contemplates nonplanar arrangements of photosensitive electronic devices.

Although the term "solar radiation" is used herein, various embodiments of the present invention pertain to sensors which can sense the orientation of a radiation source other than the sun. Further, it is understood that the photosensitive electronic device of the present invention can be sensitive to one or more portions of the spectrum of solar radiation, and may not be sensitive to some portions of the solar radiation spectrum at all. The sensor's overall spectral response is the combination of the spectral response of the photosensitive electronic device and the spectral transmission of the housing. Two examples of spectral responses are "eye-like response" and "near-infrared response." In some embodiments, the housing is tinted to provide a predetermined spectral response.

Housing 30 of apparatus 20 is preferably a dome-shaped, generally transparent cover for protection of electronic device 22. In other embodiments, housing 30 is flat or has a complex curved profile. In some embodiments, housing 30 can include cosmetic texturing to provide some scattering or reorientation of solar energy that is incident upon outer surface 32 as it travels through the thickness of the housing wall and exits interior surface 34. However, the invention is not so limited, and housing 30 can have little, if any, diffusive properties. In a preferred embodiment, housing 30 does not have any diffusive properties. Housing 30 as shown in FIGS. 1-7 is depicted schematically, and not to scale.

Housing 30 preferably includes a blocking and reflecting element such as a body 40 which depends downwardly from interior surface 34 toward electronic device 22. In other embodiments, the blocking and reflecting element is accomplished as a coating applied housing 30. In one embodiment body 40 is generally hemispherical and includes a reflecting surface 42 on a convex portion of the body. Further, body 40 preferably includes a surface which is at least partly opaque. Referring to FIG. 1, the opaque portion of body 40 can be a generally opaque coating 44 along the convex surface of body 40. Further, the blocking element could be a generally opaque coating along the interface 46 between body 40 and interior surface 34. For a source 10 of solar radiation as shown in FIG. 1, either opaque coating 44 or opaque coating 46 constitutes a shadow element projecting a shadow 50 onto the surface of electronic device 22.

Although what has been shown and described is an opaque portion of body 40 which casts shadow 50 onto device 22, the present invention is not so limited. The opaque portion of apparatus 20 can be a portion of housing 30, including portions on the outer surface 32 or inner surface 34, or embedded within the wall of housing 30. Further, the opaque portion of apparatus 20 can be of a different size and/or shape than body 40. For example, as seen in FIG. 1, body 40 is generally hemispherical. However, an opaque portion of housing 30 could be rectangular in shape.

The size of the projected area of the blocking element helps determine the response of electronic device 22 to an overhead radiation source. For example, a blocking element that is relatively small provides a relatively large response from electronic device 22 to a source 10 that is located above both the blocking element and the electronic device.

FIG. 1 shows the source 10 of solar radiation to be generally overhead of apparatus 20. Because of the opacity of body 40, a shadow 50 is cast generally onto the center of the active planar area of electronic device 22. There is little or no reflection of radiation from source 10 on the reflective surface 42 of body 40.

Figure 2:
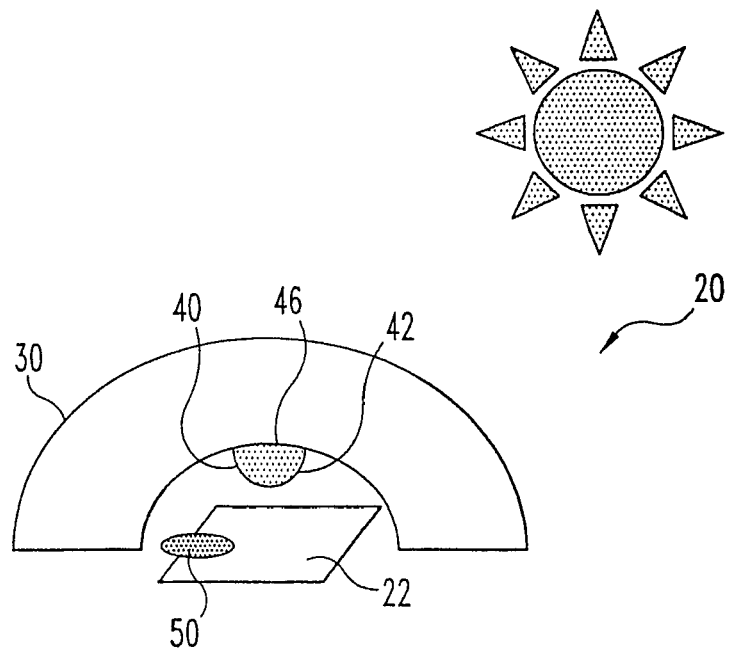
FIG. 2 is a schematic representation of the embodiment of FIG. 1, with the sun shown in a different location.

Referring to FIG. 2, the source 10 of solar radiation is displaced a moderate angle from the overhead position. Radiation from source 10 cannot penetrate the opaque portion 46 of body 40, and a shadow 50 is cast toward an edge of device 22. A portion of shadow 50 obscures some of the active area of device 22. However, the remainder of shadow 50 is cast on non-active portions of apparatus 20, which has no affect on the output of 22. Depending upon the shape of body 40, there can be little, if any, light reflected from surface 42 onto device 22.

Figure 3:
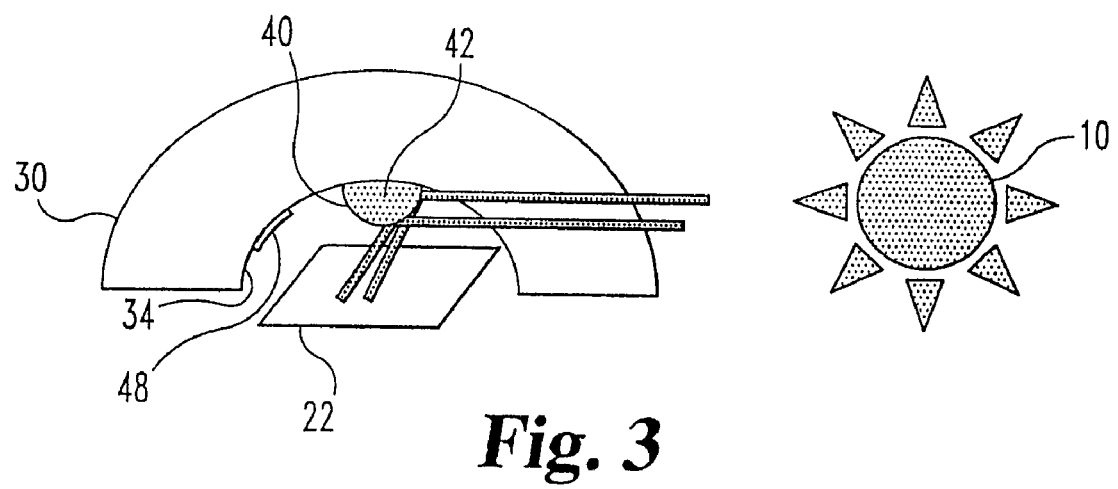
FIG. 3 is a schematic representation of the embodiment of FIG. 1, with the sun shown in a different location.

FIG. 3 is a schematic representation in which radiation source 10 is near the horizon. Radiation from source 10 is generally parallel to the active surface of device 22. However, some of the radiation passes through housing 30 and falls incident upon the reflective surface 42 of body 40. Because of the convex shape of surface 42, this solar radiation is reflected off of surface 42 and falls incident upon the photoactive elements of device 22, thus causing the response of device 22 to change.

In yet other embodiments of the present invention, a reflective coating 48 can be placed along an interior wall 34 of housing 30. Radiation from source 10 would pass over device 22, and reflect forward off of reflective surface 48 onto device 22. In some embodiments, the presence of reflecting surface 48 may be at least partly opaque for radiation received from the rear of apparatus 20. However, this may be acceptable in those embodiments in which apparatus 20 approximates a vehicular compartment with a relatively small rear window.

Figure 4:
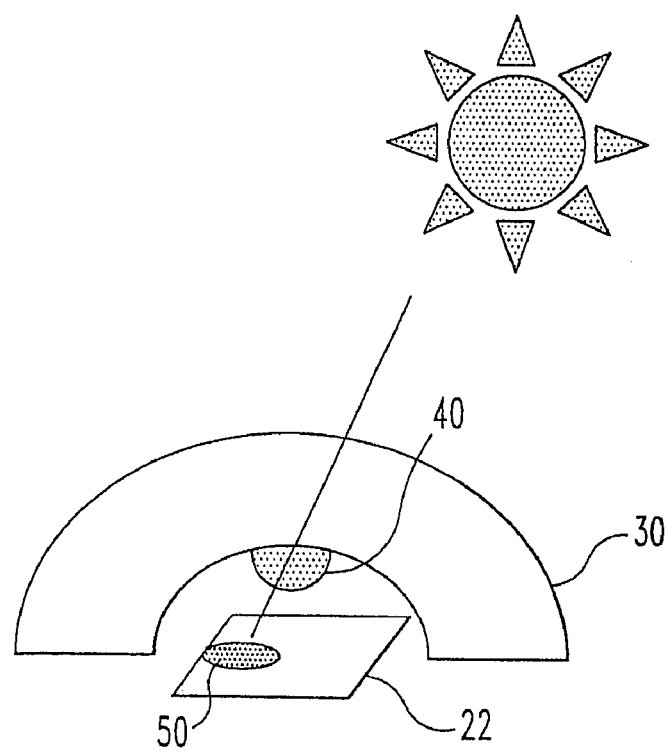
FIG. 4 is a schematic representation of the embodiment of FIG. 1, with the sun shown in a different location.
Figure 5:
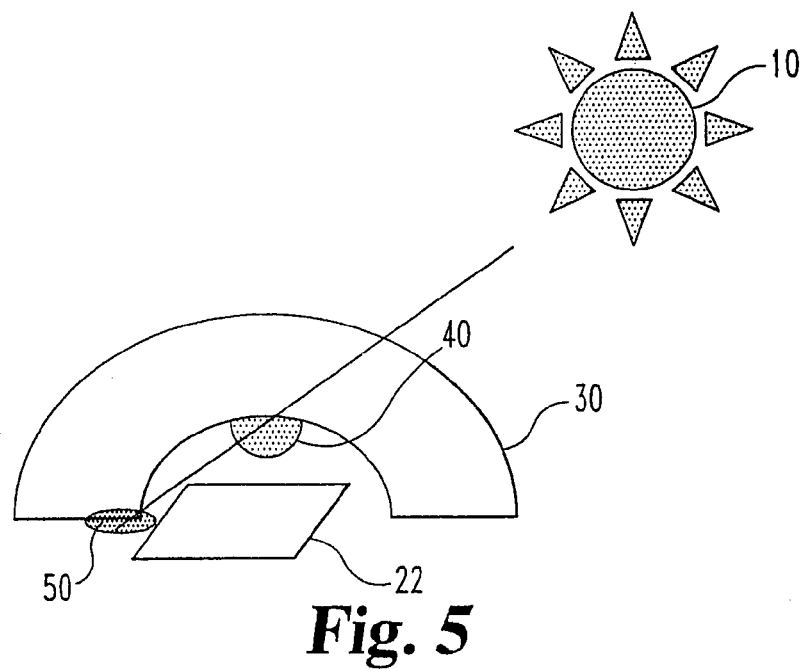
FIG. 5 is a schematic representation of the embodiment of FIG. 1, with the sun shown in a different location.

FIGS. 1, 4 and 5 illustrate schematically the range of angles over which the opaque portion of apparatus 20 influences the output of electronic device 22. Referring to FIG. 1, when source 10 is generally overhead of apparatus 20, a shadow 50 is cast directly downwards from body 40. As radiation source 10 moves to the angle represented in FIG. 4, a generally elliptical shadow 50 is cast by body 40 onto device 22. One edge of the elliptical shadow intercepts an edge of the photoactive area of device 22. For a source of radiation shown in FIGS. 1 and 4, the opaque portion of apparatus 20 has maximum and near-maximum affect on device 22. However, as source 10 further inclines toward the horizon (referring to FIG. 5) the elliptical shadow area 50 completely falls out of the active area of device 22. For the angle depicted schematically in FIG. 5, the opaque blocking features of apparatus 20 no longer affect the output of device 22.

Figure 6:
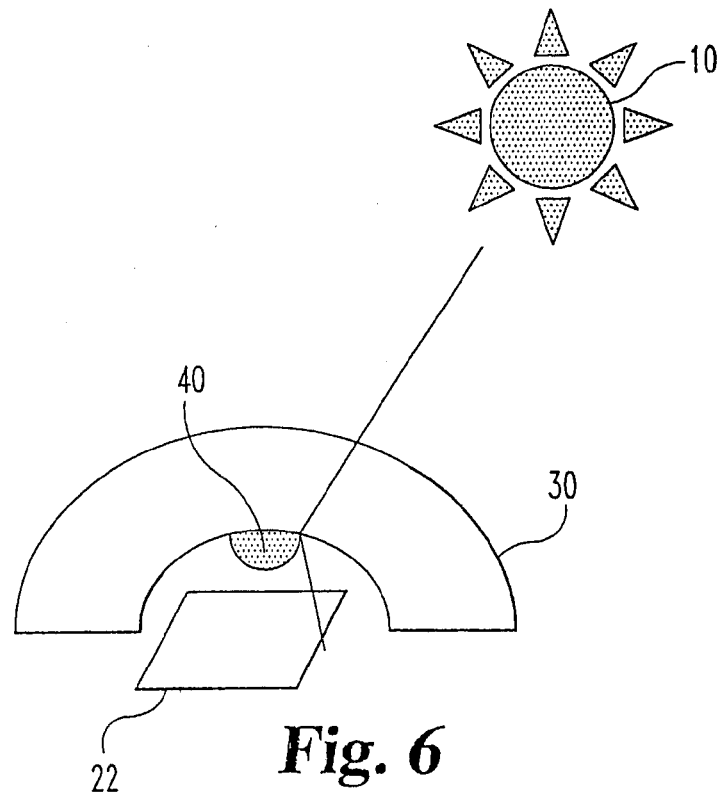
FIG. 6 is a schematic representation of the embodiment of FIG. 1, with the sun shown in a different location.

Referring to FIG. 6, source 10 is shown at an angle at which radiation from the source begins reflecting off of surface 42 and onto the active area of device 22. From this angle, and continuing for angles to the horizon, the reflecting surface 42 reflects radiation from source 10 onto the active area of device 22 and thereby modifies the output of device 22.

In one embodiment of the present invention, the range of angles from the overhead position (FIG. 1) to the position shown in FIG. 5, comprise a first range of angles over which the opaque portion of the body modifies the output of device 22. There is a second range of angles from the angle shown in FIG. 6 to the angle shown in FIG. 3 over which radiation from the source is reflected off of reflecting surface 42 and onto the active area of device 22. Both the first range of angles and the second range of angles are less than the total range of angles over which device 22 is responsive to solar radiation.

In some embodiments of the present invention, the first and second angular ranges overlap. That is, there are certain angular positions of the source of radiation for which there is a shadow cast on the electronic device, and also a portion of the radiation is reflected onto the electronic device. In yet other embodiments of the present invention, the first and second angular ranges are mutually exclusive. That is, the shadow cast by the opaque portion of the body falls off of the active area of the electronic device before any radiation is reflected off of the reflecting surface and onto the active area of the electronic device. Whether the first and second angular ranges are overlapping or exclusive can be chosen by selecting the size, shape and location of the opaque portion of apparatus 20 and the size, shape and location of the reflecting portion of apparatus 20.

Although what has been shown and described is an apparatus including a body 20 that provides both blocking and reflection of incident radiation, the present invention is not so limited. Blocking of incident radiation can be created by one or more coatings or localized surface treatments on housing 30. Likewise, reflection of radiation onto the electronic device can be accomplished by one or more reflective coatings and/or reflective bodies attached to apparatus 20.

Figure 7:
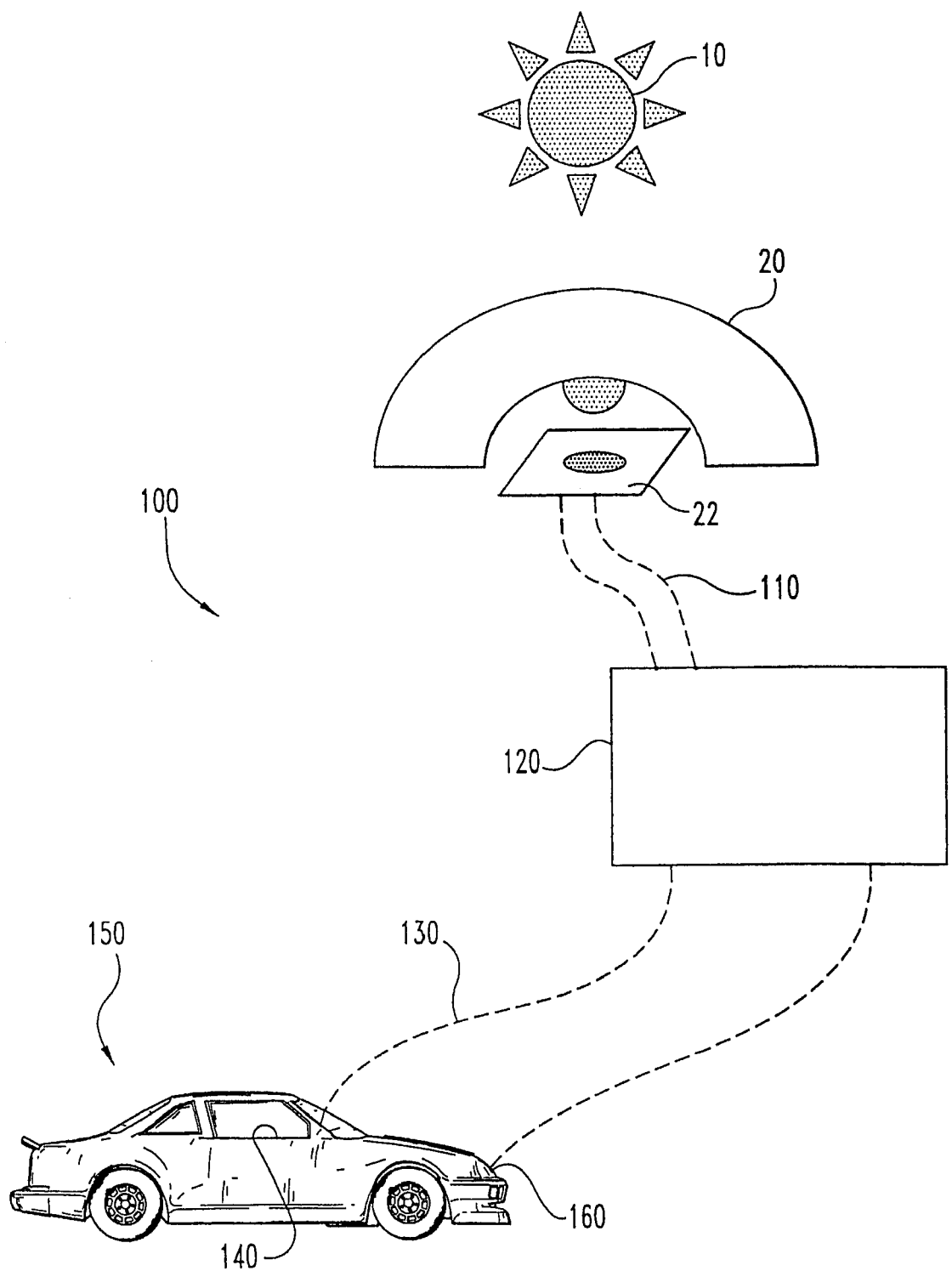
FIG. 7 is a schematic representation of a vehicle climate control system according to another embodiment of the present invention.

FIG. 7 is a schematic representation of a solar sensor according to one embodiment of the present invention as used within a vehicular system. System 100 includes a solar sensor 20. Radiation from a source 10 falls incident upon a photosensitive electronic device. This incident solar radiation changes the output characteristics of device 22, and a signal 110 corresponding to the incident solar radiation is received by an electronic controller 120. The electronic controller 120, which may be digital or analog, receives a variety of sensor and control inputs. In response to these various inputs, controller 120 establishes one or more output control signals 130 to various actuators (not shown) of a climate control system within a passenger compartment 140 of a vehicle 150. For example, controller 120 can control whether or not the air conditioning compressor is turned on, or the amount of heat from the engine being provided to a heat exchanger. In yet other embodiments of the present invention, controller 120 also controls the state of the headlights 160 of vehicle 150.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

What is claimed is:

1. An apparatus for collecting solar radiation, comprising:
   a housing including a portion which transmits solar radiation incident thereon, said housing having an interior, said housing including an opaque portion;
   a photo-sensitive electronic device located within said housing and having a photo-responsive surface which receives solar radiation and modifies an electrical signal in response thereto;
   wherein at least a portion of the opaque portion is located between the solar radiation source and said photo-responsive surface; and
   a first reflective surface located in the interior of said housing, said first reflective surface being adapted and configured to reflect radiation toward the photo-responsive surface, wherein said first reflective surface is not located between the opaque portion and the photo-responsive surface.

2. The apparatus of claim 1 wherein said first reflective surface is non-contiguous with the opaque portion of the housing.

3. The apparatus of claim 2 wherein said first reflective surface includes a reflective side and a back side, wherein, said back side will transmit a first percentage of a first luminous-flux density of solar radiation incident thereon and said reflective side will transmit a second percentage of said first luminous-flux density of solar radiation incident thereon, wherein said first percentage is substantially greater than said second percentage.

4. The apparatus of claim 1 wherein said apparatus has a front and a rear, said first reflective surface being located in the rear.

5. The apparatus of claim 1 wherein some of the radiation which is reflected towards said photo-responsive surface first passes over said photo-responsive surface before being reflected towards said photo-responsive surface.

6. The apparatus of claim 1 wherein the output characteristics of said electronic device are modified because of blocking of radiation from said photo-responsive surface by the opaque portion and reflecting of solar radiation reflecting of radiation from said first reflective surface.

7. The apparatus of claim 1 wherein said portion of said housing includes texturing which reorients the transmitted solar radiation.

8. The apparatus of claim 1 wherein the photo-sensitive electronic device includes one or more active elements arranged on a planar surface.

9. The apparatus of claim 8 further including an opaque divider between said active elements.

10. The apparatus of claim 1 wherein the photo-sensitive electronic device includes an array of photodiodes arranged on a plurality of different planar surfaces.

11. The apparatus of claim 1 wherein said photo-responsive surface is oriented at a downward facing angle.

12. The apparatus of claim 1 further comprising:
   a second reflective surface adapted and configured to reflect radiation towards said photo-responsive surface.

13. The apparatus of claim 12 wherein said second reflective surface is located between said photo-responsive surface and the opaque portion.

14. The apparatus of claim 13 wherein the output characteristics of said electronic device are modified because of blocking of radiation from said photo-responsive surface by the opaque portion and reflecting of solar radiation reflecting of radiation from said second reflective surface.

15. The apparatus of claim 14 wherein said photo-responsive surface has a first area, the area of said photo-responsive surface blocked by the opaque portion has a second area, and the second area is less than the first area.

16. The apparatus of claim 12 wherein said second reflective surface is curved.

17. The apparatus of claim 16 wherein the shape of said second reflective surface is chosen from the group consisting of partially spherical, parabolic, conical, and frusto-conical.

18. The apparatus of claim 12 wherein said first surface and said second surface are non-contiguous.

19. The apparatus of claim 13 wherein said second reflective surface is generally centered above the photo-responsive surface.

20. The apparatus of claim 1 wherein said electronic device is a photodiode.

21. The apparatus of claim 1 wherein said first reflective surface is located on said housing.

* * * * *

UNITED STATES PATENT AND TRADEMARK OFFICE
CERTIFICATE OF CORRECTION

PATENT NO.       : 7,235,765 B2                                           Page 1 of 1
APPLICATION NO.  : 11/419352
DATED            : June 26, 2007
INVENTOR(S)      : P. Edward Clugston, Jr.

It is certified that error appears in the above-identified patent and that said Letters Patent is hereby corrected as shown below:

On the Title page of the patent

Item (56), References Cited
Insert --DE 38 21 743  11/1990  Nolting--

Signed and Sealed this

Twenty-eighth Day of August, 2007

JON W. DUDAS
*Director of the United States Patent and Trademark Office*